United States Patent
Tokutsu et al.

(10) Patent No.: US 6,686,868 B2
(45) Date of Patent: Feb. 3, 2004

(54) RADAR RANGING DEVICE FOR PERFORMING MERGING PROCESS ON A PLURALITY OF DETECTED TARGETS

(75) Inventors: Masahiro Tokutsu, Kobe (JP); Masayuki Kishida, Kobe (JP); Tokio Shinagawa, Kobe (JP)

(73) Assignee: Fujitsu Ten Limited (JP)

( * ) Notice: Subject to any disclaimer, the term of this patent is extended or adjusted under 35 U.S.C. 154(b) by 0 days.

(21) Appl. No.: 10/292,153

(22) Filed: Nov. 12, 2002

(65) Prior Publication Data

US 2003/0090409 A1 May 15, 2003

(30) Foreign Application Priority Data

Nov. 13, 2001 (JP) ........................... 2001-347693

(51) Int. Cl.$^7$ ............................................. G01S 13/93
(52) U.S. Cl. ..................... 342/70; 342/71; 342/72; 342/108; 342/115; 342/195
(58) Field of Search ............... 342/70, 71, 72, 342/89, 90, 107, 108, 115, 189, 195

(56) References Cited

U.S. PATENT DOCUMENTS

| | | | |
|---|---|---|---|
| 5,341,142 A | * | 8/1994 | Reis et al. ............... 342/64 |
| 5,574,463 A | * | 11/1996 | Shirai et al. ............ 342/70 |
| 6,204,755 B1 | * | 3/2001 | Kikuchi .................. 340/435 |
| 6,593,873 B2 | * | 7/2003 | Samukawa et al. ........ 342/70 |
| 2002/0003489 A1 | * | 1/2002 | Samukawa et al. ........ 342/70 |
| 2002/0014988 A1 | * | 2/2002 | Samukawa et al. ........ 342/70 |
| 2003/0090409 A1 | * | 5/2003 | Tokutsu et al. .......... 342/70 |

FOREIGN PATENT DOCUMENTS

JP A-55-110973 8/1980

OTHER PUBLICATIONS

"Multifunctional millimeter wave radar sensor for vehicle applications", Woilitzer, M et al; Physics and Engineering of Millimeter and Submillimeter Waves, 1998. MSMW '98. Third Int'l Kharkov Symposium, Sep. 15–17 1998 Ps: 124–129 vol. 1.*

* cited by examiner

Primary Examiner—John B. Sotomayor
(74) Attorney, Agent, or Firm—Fogg and Associates, LLC; Laura A. Ryan

(57) ABSTRACT

In a target merging process in a radar ranging device, determination of continuity is accurately performed and output processing of newly appearing targets is performed rapidly. The current target position (data prior to merging) is calculated (S1), and a predicted position is calculated (S2). The continuity of targets whose previous position and current position satisfy predetermined conditions (S3 to S5) is determined (S6 to S7). After the data prior to merging is stored in a buffer (S9), the merging process is performed. By storing the data prior to merging in the buffer, continuity is determined for each detected target and, therefore, even if the position of a target changes after merging, subsequent determination of continuity can be performed accurately.

4 Claims, 4 Drawing Sheets

RADAR RANGING DEVICE FOR PERFORMING MERGING PROCESS ON A PLURALITY OF DETECTED TARGETS

BACKGROUND OF THE INVENTION

1. Field of the Invention

The present invention relates to a radar ranging device and, in particular, to a merging process for detected target data.

2. Description of the Related Art

Radar ranging devices detect the existence of targets in a forward direction by means of signal processing, which is performed by emitting waves in a forward direction and detecting waves reflected from an object in the forward direction.

When a large target such as a truck exists in the forward direction of the radar ranging device, the radar ranging device may detect a plurality of target data from the one truck. In the radar ranging device, if a plurality of targets are detected, it determines that all targets satisfying predetermined conditions are one target, and performs a process whereby the plurality of targets are merged and target data for one target are output. By this means, the data processing load on devices utilizing the output data from the radar ranging device (for example, a vehicle distance control ECU) is reduced.

Also, in the radar ranging device, when targets detected in a current target detection cycle exist within a predetermined limit around the position of a target detected in the previous detection cycle, it determines that there is continuity between the previously detected target and the currently detected target, and processes them as the same target.

In a process for merging a plurality of detected target data in the prior art, due to the merging of the plurality of target data, the detected position of the target after merging is slightly shifted from the position of the target prior to merging. As a result, when determining continuity between the target merged by the previous process and the currently detected target, it is possible to determine continuity with an erroneous target due to the shift in the detected target.

Also, when a plurality of target data that has been determined to be the same target and subjected to the merging process is outside the merging conditions in the current process, it is taken as a completely new target that has only just appeared, and requires processing of different target data. However, when a new target appears, continuity is determined for each new set of target data. In the continuity determination process, if this new target is continuously detected between a plurality of cycles, it is determined that a new target has appeared. As a result, a target that does not meet the merging conditions causes a delay in the output from the radar ranging device in the same manner as when a new target appears.

Further, when merging between targets, merging is not performed for the same target after merging. As a result, when one target is determined to be a plurality of targets because it is outside the merging conditions, even if both positions are detected in close proximity to each other thereafter, they may not be merged. Consequently, a plurality of sets of target data are output for one target.

SUMMARY OF THE INVENTION

The present invention has as its object to accurately perform continuity determinations in the target merging process in a radar ranging device.

The present invention also has as its object rapid performance of new target output processing when a target merged by a merging process has diverged from the merged target data.

A further object of the present invention is to allow, in a radar ranging device, an additional merging process when a target is in proximity after merging.

The present invention was created in order achieve the above objects. In the present invention, in a radar ranging device having a target recognition section for performing a merging process, the target recognition section merges target data and handles the target data as one target when there is continuity between detected target data and those detected target data satisfying predetermined conditions, and stores the target data before execution of the merging process and the target data after execution of the merging process in a buffer memory.

According to the present invention, in the target data merging process, the continuity of each target data is determined using the target data prior to merging stored in the buffer memory, then the continuity of each of the merged target data can be determined using the target data after merging stored in the buffer memory. By this means, even if the detected position of targets change due to merging, continuity can be accurately determined.

Also, in the present invention, when target data not merged in the current process has been merged with other target data in the previous process, whether there is continuity between the target data not merged in the current process and the merged target data in the previous process is determined. If it is determined that there is continuity, the data is taken as being the same target that has diverged, and the target data that has not been merged in the current process is immediately output as diverged target data. As a result, when a target of a previous merging process separates, it is immediately output as new target data without delay.

Also, in the present invention, when target data merged in a previous process meet predetermined conditions, the target data after merging are again merged (re-merged). By this means, only one set of merged target data is output for the same target.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

Hereafter, the embodiment of the present invention will be described with reference to drawings.

Figure 1:
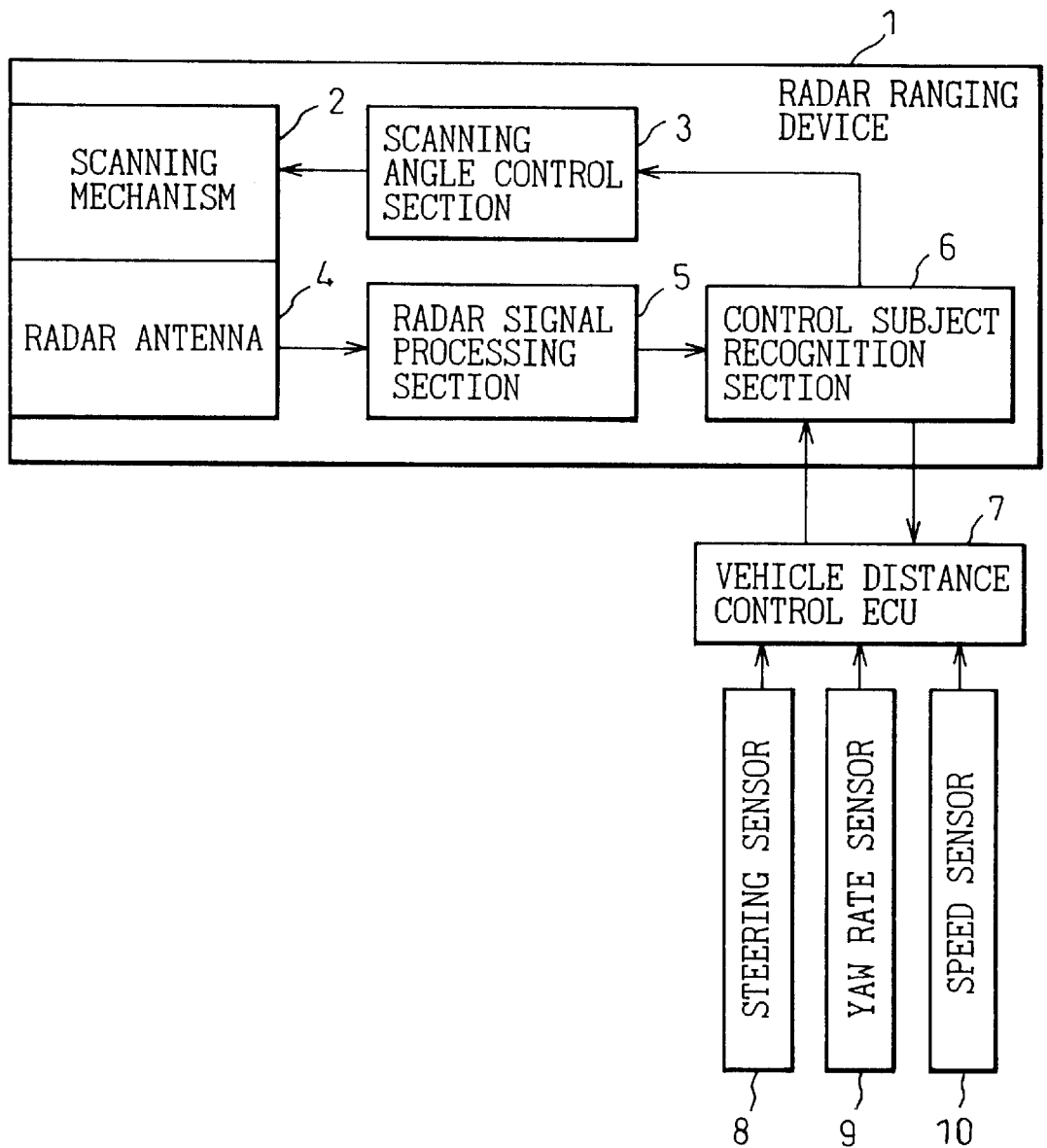
FIG. 1 is circuit diagram of a radar ranging device to which the present invention is applied.

FIG. 1 shows the circuit structure of a radar ranging device 1.

The radar ranging device 1 is an FM-CW type millimeter wave radar mounted in a vehicle, for example. A scanning mechanism 2 emits millimeter waves while scanning a detection field in the forward direction of the vehicle, controlled by a scanning angle control section 3.

The millimeter waves reflected by a target existing in the forward direction of the vehicle are detected by a radar antenna 4. A radar signal processing section 5 FFT processes the reflected signal and calculates the detected distance to the target, transverse position, and relative speed, then transmits the data to a control subject recognition section 6. The control subject recognition section 6, as well as indicating the scanning angle to the scanning angle control section 3, determines the target which is the control subject and transmits this determination to a vehicle distance control ECU 7, based on the received detected distance to target, transverse position and relative speed data, and data received from the vehicle distance control ECU 7, obtained from a steering sensor 8, yaw rate sensor 9 and speed sensor 10.

The continuity determination and extrapolation process in the control subject recognition section 6 is as follows.

Figure 2:
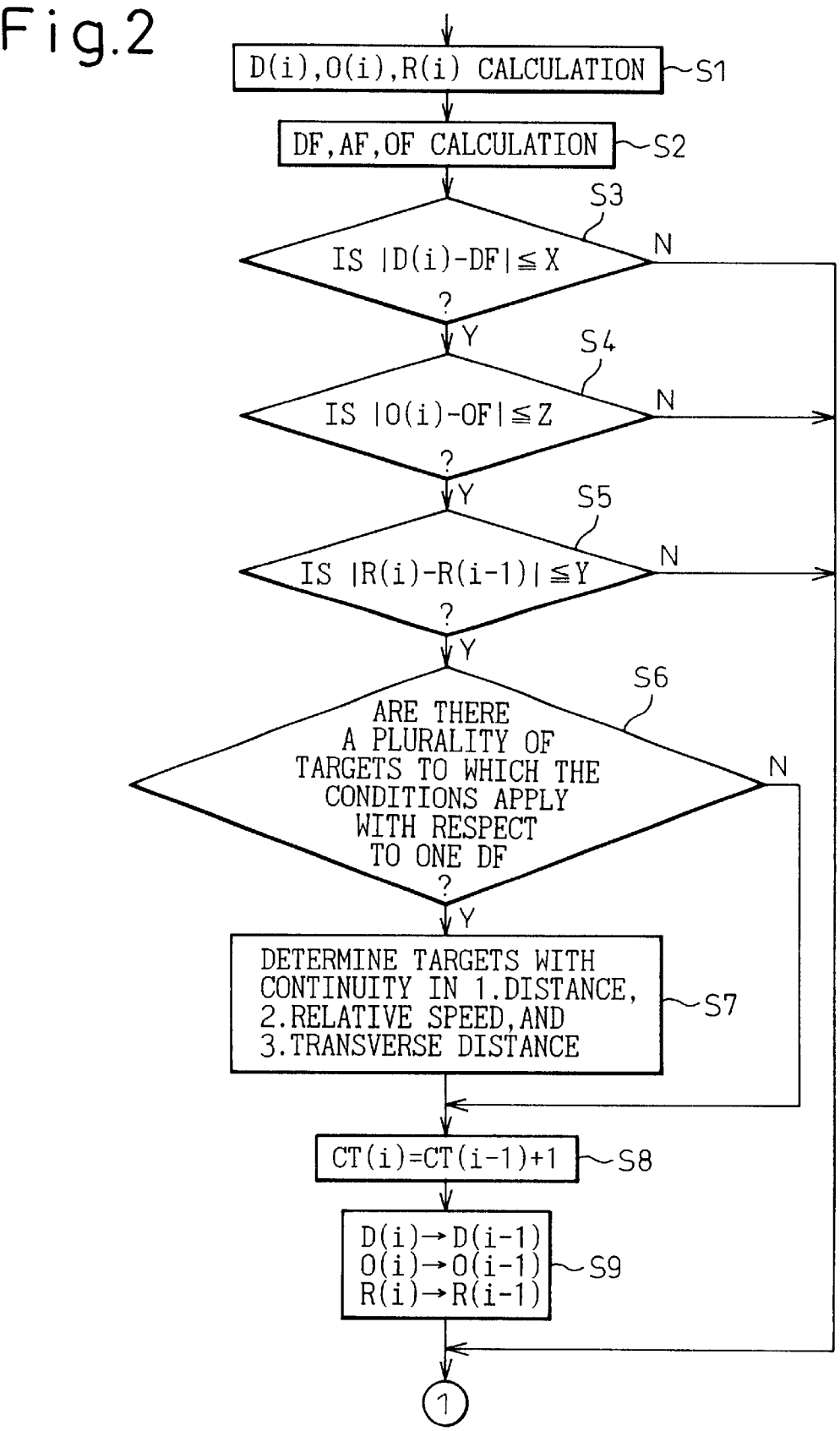
FIG. 2, FIG. 3 and FIG. 4 are a flowchart showing the operation of the radar ranging device of FIG. 1.
Figure 3:
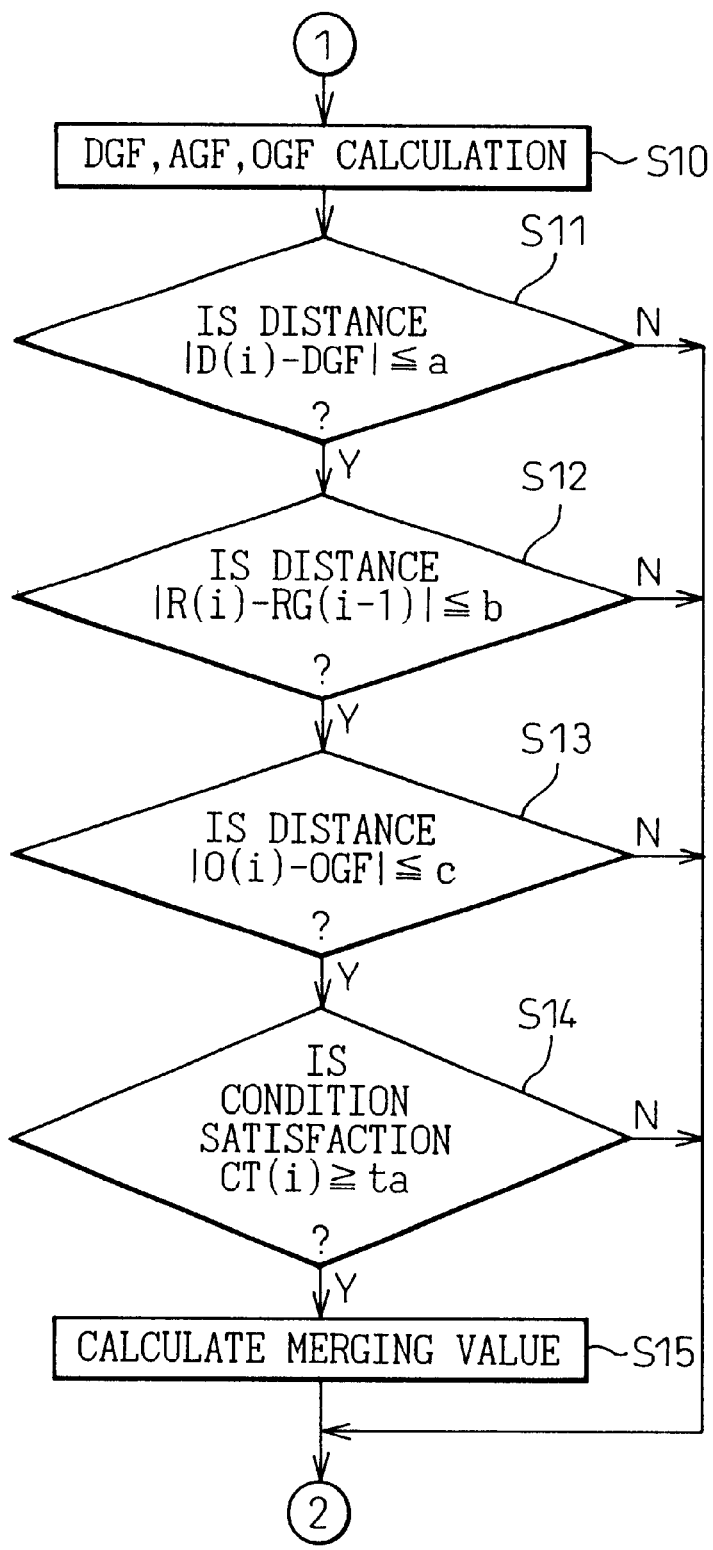
Figure 4:
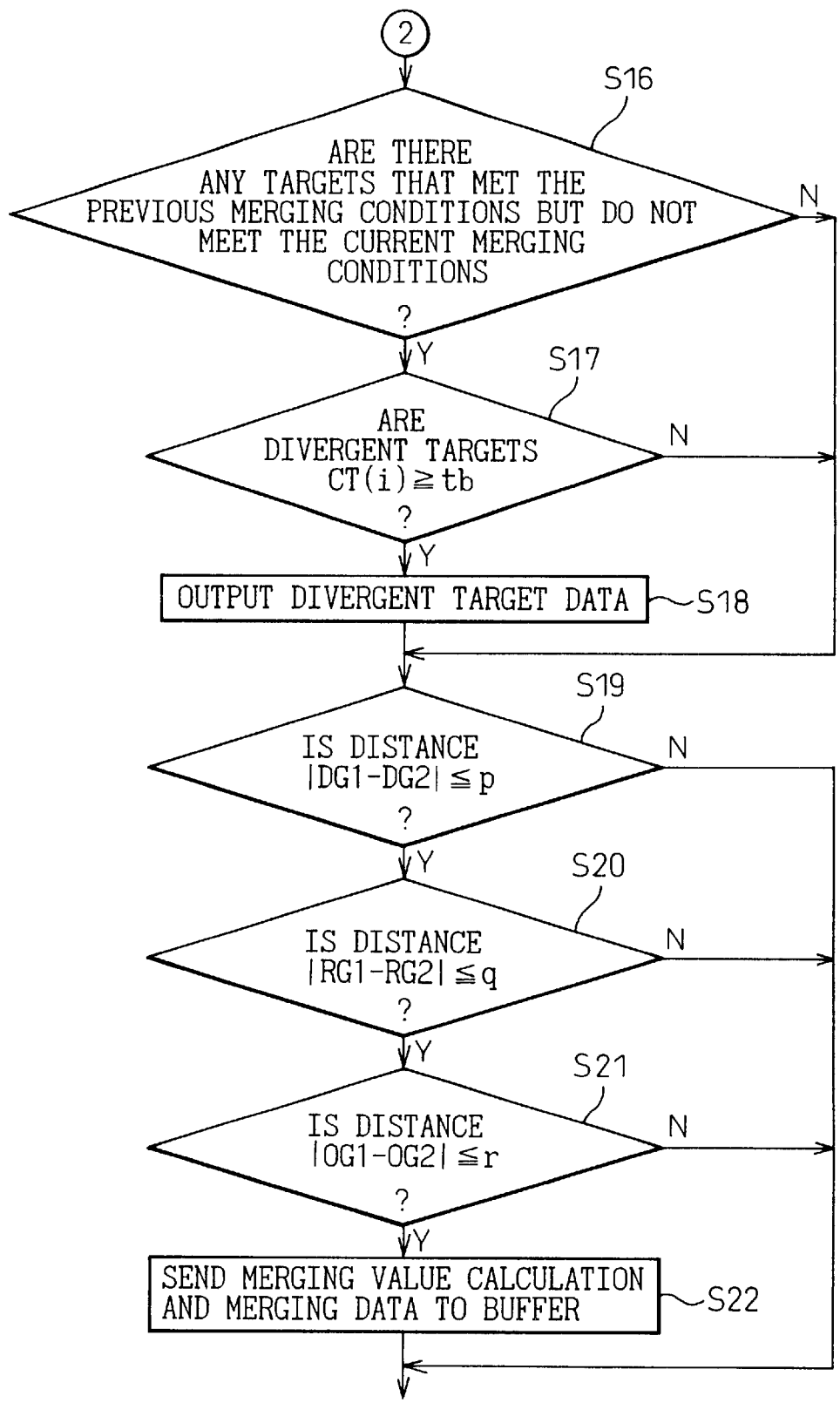

The flowchart of FIGS. 2 to 4 shows the merging process in the control subject recognition section 6. As the other determination method for targets in the control subject recognition section 6 is well known in the art, an explanation thereof will be omitted here. The process shown in the drawings is repeated for each of the operation cycles T.

The continuity determination of data prior to merging is performed in steps S1 to S7.

In step S1, based on data obtained from the radar signal processing section 5 or the like, a current detected distance D(i), a current detected transverse distance O(i), and a current detected relative speed R(i) are calculated for all detected targets (data prior to merging).

In step S2, a current predicted distance DF, current predicted angle AF, and current predicted transverse position OF are calculated using the prior target data stored in the buffer memory, by means of the following equations.

Current predicted distance $DF=D(i-1)+R(i-1)\times 1000/T$

Current predicted angle $AF=A(i-1)\times D(i-1)/DF$

Current predicted transverse position $OF=DF\sin(AF)$ where D(i−1) is the previous detected distance (m), R(i−1) is the previous detected relative speed (m/s), A(i−1) is the previous detected angle (deg), and T is an operation cycle (msec).

The determination of continuity with the above data prior to merging is performed in steps S3 to S5.

In step S3 it is determined whether the current detected distance D(i) meets the following conditions, in step S4 it is determined whether the current detected relative speed R(i) meets the following conditions, and in step S5 it is determined whether the current detected transverse position O(i) meets the following conditions.

$|D(i)-DF|\leq X$ $|R(i)-R(i-1)|\leq Y$ $|O(i)-OF|\leq Z$ where X is the continuity determination distance condition (m), Y is the continuity determination relative speed condition (m/s), and Z is the continuity determination transverse position condition (m).

If all of the conditions of steps S3 to S5 are satisfied, the procedure advances to step S6. If any of the conditions of steps S3 to S5 are not satisfied, it is determined that there is no continuity, and that target is removed from the subsequent merging determination process.

In step S6, whether or not a plurality of targets exist, to which the above conditions of steps S3 to S5 apply, is determined with respect to the predicted distance DF of one target. If there is a plurality of targets, the procedure advances to step S7, where the merging process is begun on the relevant targets. If there is no plurality of targets, the merging process of step S7 is unnecessary, therefore the procedure advances to step S8.

In step S7, an order of priority is assigned to the plurality of targets that meet the conditions, the targets that possess continuity are determined, and the procedure advances to step S8. The order of priority is: 1. proximity in distance, 2. proximity in relative speed, and 3. proximity in transverse position.

In step S8, one is added to the previous value CT(i−1) of the continuity counter to make the current value of the continuity counter CT(i).

In step S9, each set of data for each target prior to merging D(i), O(i) and R(i) is stored in the buffer memory. The current target data stored here are used in the next continuity determination process as the previous detected distance D(i−1), previous detected transverse position O(i−1), and previous detected relative speed R(i−1).

As described above, the present embodiment determines the continuity of target data prior to merging. Consequently, erroneous determination of continuity between targets due to target position shift after merging can be prevented.

In step S10, the predicted positions of the target data after merging are calculated. Here, a current predicted distance DGF, a predicted angle AGF, and a predicted transverse position OGF are calculated from the previous data after merging, using the following equation. Note that step S10 can also be performed at a stage earlier than this.

$DGF=DG(i-1)+RG(i-1)\times 1000/T$ $AGF=AG(i-1)\times DG(i-1)/DGF$ $OGF=DGF\sin(AGF)$ where DG(i−1) is the previous detected distance after merging, RG(i−1) is the previous detected relative speed after merging, AG(i−1) is the previous detected angel after merging, and T is the operation cycle (msec).

In steps S11 to S14, determination of merging conditions for the plurality of target data is performed.

In step S11 it is determined whether the current detected distance D(i) meets the following conditions, in step S12 it is determined whether the current detected relative speed R(i) meets the following conditions, and in step S13 it is determined whether the current detected transverse position O(i) meets the following conditions.

$|D(i)-DGF|\leq a$ $|R(i)-R(i-1)|\leq b$ $|O(i)-OGF|\leq c$ where a is a merging distance condition (m), b is a merging relative speed condition (m/s), and c is a merging transverse position condition (m).

In step S14, it is determined whether or not the value of the continuity counter CT(i) for the targets that satisfy the conditions of steps S11 to S13 is equal to or more than a continuity counter merge determination value ta.

Those current detected targets prior to merging that satisfy all of the conditions of the above steps S11 to S14 are merged into one target and a merge value for the merged target data is calculated in step S15.

Those targets that do not satisfy any one of steps S11 to S14 are not merged and do not pass through step S15, but proceed to step S16.

The distance, relative speed and transverse position of the merge value in step S15 are calculated as follows.

The minimum value among the merged plurality of target data is used as the distance value.

An average value of the merged target data is used for the relative speed value.

An average value of the merged target data is used as the transverse position value.

In steps S16 to S18, it is determined whether the target data not merging processed in steps S11 to S14 are divergent targets, and if so, diverged target data is output.

In step S16, if it is determined that there are targets that met the merging conditions in the previous process but do not meet the merging conditions in the current process, those targets are treated as divergent targets that have separated from the merged targets. In step S17 it is determined whether the count value of the continuity counter CT(i) for the diverged target data is equal to or greater than a continuity counter output determination value tb. Here, if the continuity of diverged targets is recognized, the diverged target data is immediately output.

By means of this process and if, for example, a motorbike that is traveling together with a truck and is thus detected as the same target as the truck then separates from the truck, the data for the motorbike can then be immediately output as a newly appearing target.

On the other hand, targets that do not satisfy any one of the conditions of steps 16 and 17 are processed normally as newly appearing targets. In other words, they are not output as newly appearing target data until they are subjected to a continuity check for several cycles thereafter and satisfy the conditions for continuity.

In steps S19 to S21, it is determined whether the merged targets require re-merging.

In step S19, whether the relationship of current distance DG1 of a merged target 1 and current distance DG2 of a merged target 2 satisfy the following conditions, in step S20, whether the relationship of current relative speed RG1 of the merged target 1 and current relative speed RG2 of the merged target 2 satisfy the following conditions, and in step S21, whether the relationship of transverse position OG1 of the merged target 1 and current transverse position OG2 of the merged target 2 satisfy the following conditions, is determined.

$$|DG1-DG2| \leq p$$

$$|RG1-RG2| \leq q$$

$$|OG1-OG2| \leq r$$

where p is a re-merging distance condition (m), q is a re-merging relative speed condition (m/s), and r is a re-merging transverse position condition (m).

If all of the above conditions are met, the procedure advances to step S22. In step S22, the merged targets are re-merged and a merged value is calculated by the following equation.

Distance: the minimum value among the merged target data.

Relative speed: the average value of the merged target data.

Transverse position: the average value of the merged target data.

In the above embodiment, although only two targets have been have been used as comparative examples, in actuality the re-merging conditions are checked for all merged targets.

By performing re-merging with respect to targets after merging in the above manner, only one set of data is output for the same target.

The merged value calculated here is stored in the buffer memory. These target data are used as the previous detected distance DG(i−1) of data after merging, the previous detected angle AG(i−1) of data after merging, and the previous detected relative speed RG(i−1) of data after merging.

According to the present invention, in a target merging process, continuity processing of the same target before merging is possible, and output processing of targets that have diverged after merging is not delayed.

What is claimed is:

1. A radar ranging device, comprising:

a scanning section for emitting electrical waves;

a signal processing section for calculating target data by processing reflected signals obtained from electrical waves reflecting from targets; and a target recognition section for, when a plurality of targets are detected based on target data output from the signal processing section, performing merging processing on each of the targets and outputting target data after merging processing wherein, when there is continuity in each of the detected target data and the target data satisfy predetermined conditions, the target data are merged and handled as one set of data and target data prior to the merging process being executed, and target data after the merging process has been executed, are stored in a buffer memory.

2. The radar ranging device of claim 1, wherein the target recognition section calculates a predicted position of previous merging processed target data, and executes re-merging of target data based on data after merging.

3. The radar ranging device of claim 1, wherein, when current unmerged target data are determined to have continuity with previously merged target data, the target recognition section outputs the current unmerged target data as target data which has diverged from an existing target.

4. The radar ranging device of claim 1, wherein the target recognition section performs merging of each set of the same detected target data and merging of the same merged target data, and merging processing for each merging is executed by means of different determination conditions.

* * * * *